(12) United States Patent
Mueller et al.

(10) Patent No.: US 12,474,284 B2
(45) Date of Patent: Nov. 18, 2025

(54) METHOD OF INSPECTING A SAMPLE, AND MULTI-ELECTRON BEAM INSPECTION SYSTEM

(71) Applicant: Applied Materials, Inc., Santa Clara, CA (US)

(72) Inventors: Bernhard G. Mueller, Finsing (DE); Peter Nunan, Monte Sereno, CA (US)

(73) Assignee: Applied Materials, Inc., Santa Clara, CA (US)

( * ) Notice: Subject to any disclaimer, the term of this patent is extended or adjusted under 35 U.S.C. 154(b) by 429 days.

(21) Appl. No.: 17/906,454

(22) PCT Filed: Apr. 17, 2020

(86) PCT No.: PCT/EP2020/060826
§ 371 (c)(1),
(2) Date: Sep. 15, 2022

(87) PCT Pub. No.: WO2021/209147
PCT Pub. Date: Oct. 21, 2021

(65) Prior Publication Data
US 2023/0133404 A1 May 4, 2023

(51) Int. Cl.
*G01N 23/2251* (2018.01)
(52) U.S. Cl.
CPC ..... *G01N 23/2251* (2013.01); *G01N 2223/07* (2013.01); *G01N 2223/3308* (2013.01); *G01N 2223/6116* (2013.01)
(58) Field of Classification Search
CPC ........... G01N 23/2251; G01N 2223/07; G01N 2223/3308; G01N 2223/6116;
(Continued)

(56) References Cited

U.S. PATENT DOCUMENTS 6,184,526 B1 2/2001 Kohama et al.
9,466,463 B1* 10/2016 Lam ................. H01J 37/28
(Continued)

FOREIGN PATENT DOCUMENTS

CN 109690747 A 4/2019

OTHER PUBLICATIONS

International Search Report and Written Opinion, PCT/EP2020/060826, Mar. 3, 2021.
(Continued)

*Primary Examiner* — Jason L Mccormack
(74) *Attorney, Agent, or Firm* — Patterson + Sheridan, LLP

(57) ABSTRACT

A method for inspecting a sample with a multi-electron beam inspection system (100) is described. The method includes: placing the sample on a movable stage (110) extending in an X-Y-plane; generating a plurality of electron beams (105) propagating toward the sample; focusing the plurality of electron beams on the sample at a plurality of probe positions (106) in a two-dimensional array; scanning the sample surface by moving the movable stage in a predetermined scanning pattern while maintaining the plurality of electron beams stationary; and detecting signal electrons emitted from the sample during the movement of the movable stage for inspecting the sample. Further, a multi-electron beam inspection system (100) for inspecting a sample according to the above method is described.

19 Claims, 4 Drawing Sheets

(58) Field of Classification Search
CPC ......... G01N 2223/306; G01N 2223/33; G01N 2223/501; H01J 37/00; H01J 37/02; H01J 37/26; H01J 37/28
USPC .......................................... 250/306, 307, 311
See application file for complete search history.

(56) References Cited

U.S. PATENT DOCUMENTS

| | | | |
|---|---|---|---|
| 2003/0001095 A1* | 1/2003 | Lo ......................... | B82Y 40/00 250/346 |
| 2004/0051049 A1* | 3/2004 | Liu ........................ | H01J 37/20 250/442.11 |
| 2004/0113101 A1* | 6/2004 | Li ......................... | H01J 37/302 250/492.22 |
| 2005/0045821 A1 | 3/2005 | Noji et al. | |
| 2017/0154756 A1 | 6/2017 | Ren et al. | |
| 2018/0068825 A1 | 3/2018 | Brodie | |
| 2018/0090296 A1* | 3/2018 | Neil ....................... | H01J 37/20 |
| 2019/0051487 A1 | 2/2019 | Ogasawara et al. | |
| 2019/0195815 A1 | 6/2019 | Kikuiri et al. | |
| 2020/0064743 A1 | 2/2020 | Shimizu et al. | |

OTHER PUBLICATIONS

Tawian Office Action dated Jul. 19, 2023 for Patent Application No. 110110584.
European Office Action dated Jan. 8, 2025 for Application No. 20720028.8.
Office Action in related application CN 202080099760.6 dated May 1, 2025.
Korean Office Action for Application No. 10-2022-7039986 mailed Jul. 26, 2025 (44017834KR01).

* cited by examiner

METHOD OF INSPECTING A SAMPLE, AND MULTI-ELECTRON BEAM INSPECTION SYSTEM

FIELD

The present disclosure relates to a method and a system for inspecting a sample with charged particle beams. More specifically, embodiments described herein relate to the inspection of a sample with a plurality of electron beams in parallel. Particularly, embodiments relate to methods of inspecting a sample with a multi-electron beam inspection system, and to multi-electron beam inspection systems for the fast inspection of samples with a high resolution, e.g. for inspecting semiconductor wafers or other substrates.

BACKGROUND

Charged particle beam devices, particularly electron microscopes, have many functions in a plurality of industrial fields, including, but not limited to, critical dimensioning of semiconductor devices during manufacturing, defect review of semiconductor devices, inspection and imaging of semiconductor devices, exposure systems for lithography, detecting devices and testing systems, such as electron beam inspection systems. Thus, there is a high demand for structuring, testing, and inspecting samples within the micrometer and nanometer scale.

Micrometer and nanometer scale process control, inspection or structuring is often done with charged particle beams, particularly with electron beams, which are generated and focused in charged particle beam devices, such as electron microscopes. Charged particle beams offer superior spatial resolution compared to, e.g., photon beams, due to the short wavelengths.

In many applications, a sample is inspected to monitor the quality of the sample. For example, wafers or glass substrates on which layers of coating material and/or electronic devices are deposited are manufactured for the display market or for producing electronic chips or integrated die packages. Since defects may occur during the processing of the samples, e.g. during the coating, an inspection of the samples for reviewing the defects and for monitoring the quality may be beneficial. Additionally, the size, shape and relative location of structures created by any patterning process needs to be monitored and controlled.

Inspecting samples with a high resolution within the nanometer range, e.g. with a scanning electron microscope, is time consuming. In order to increase the sample throughput, only selected areas of the sample may be inspected, e.g. areas that on average include more defects than others. Alternatively, only random sub-portions of samples may be inspected for increasing the throughput.

Another approach for increasing the throughput is the parallel inspection of a sample with several electron beams at the same time. For example, a multi-electron beam inspection system may include several inspection columns for inspecting a sample at a higher speed, though typically with a reduced resolution.

Samples are typically inspected by scanning one or more electron beams of a scanning electron microscope (SEM) system over a sample surface with scan deflectors, followed by a movement of the sample to position another part of the sample in the field of view of the SEM. However, SEMs with scan deflectors are complex, large and expensive devices.

In view of the above, it would be highly beneficial to provide electron beam inspection methods and systems for quickly and reliably inspecting samples with a high resolution, such as wafers or large-area substrates.

SUMMARY

In light of the above, a method of inspecting a sample with a multi-electron beam inspection system, and multi-electron beam inspection systems are provided. Further aspects, advantages and features of the present disclosure are apparent from the description and the accompanying drawings.

According to one aspect, a method of inspecting a sample is provided. The method includes: placing the sample on a movable stage extending in an X-Y-plane; generating a plurality of electron beams propagating toward the sample; focusing the plurality of electron beams on the sample at a plurality of probe positions arranged in a two-dimensional array; scanning the sample by moving the movable stage in a predetermined scanning pattern while maintaining the plurality of electron beams stationary; and detecting signal electrons emitted from the sample during the scanning for inspecting the sample. In some embodiments, the plurality of electron beams may propagate essentially parallel to each other toward the sample.

According to another aspect, a multi-electron beam inspection system is provided. The multi-electron beam inspection system is configured to carry out the sample inspection methods described herein. In particular, the multi-electron beam inspection system may include a movable stage extending in an X-Y-plane for placing the sample thereon, and a plurality of inspection columns for generating a plurality of electron beams and configured to focus the plurality of electron beams on the sample at a plurality of probe positions arranged in a two-dimensional array. The plurality of inspection columns respectively include a beam emitter, a focusing lens, and a detector for detecting signal electrons. The multi-electron beam inspection system further includes a stage controller configured to move the movable stage in a predetermined scanning pattern during an inspection of the sample while maintaining the plurality of electron beams stationary. In some embodiments, the plurality of inspection columns may be configured for generating the plurality of electron beams such that the electron beams propagate essentially parallel to each other toward the sample.

The plurality of inspection columns may be static electron beam microcolumns without scan deflectors, configured to provide static electron beams while the movable stage is moved in a scanning pattern for scanning the sample.

According to another aspect, a multi-electron beam inspection system is provided. The system includes a plurality of inspection columns without scan deflectors, being arranged in a two-dimensional array in X- and Y-directions and facing toward a movable stage for placing the sample thereon, and a stage controller configured to move the movable stage in a predetermined scanning pattern in an X-Y-plane.

Embodiments are also directed at assemblies for carrying out the disclosed methods and include assembly parts for performing each described method aspect. These method aspects may be performed by way of hardware components, a computer programmed by appropriate software, and any combination of the two or in any other manner. Furthermore, embodiments according to the disclosure are also directed at methods for operating the described assemblies and methods of manufacturing the described systems. The methods for operating the described assembly include method aspects for carrying out every function of the assembly.

BRIEF DESCRIPTION OF THE DRAWINGS

So that the manner in which the above recited feature of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered as limiting. A full and enabling disclosure to one of ordinary skill in the art is set forth more particularly in the remainder of the specification including reference to the accompanying drawings wherein.

DETAILED DESCRIPTION

Figure 1:
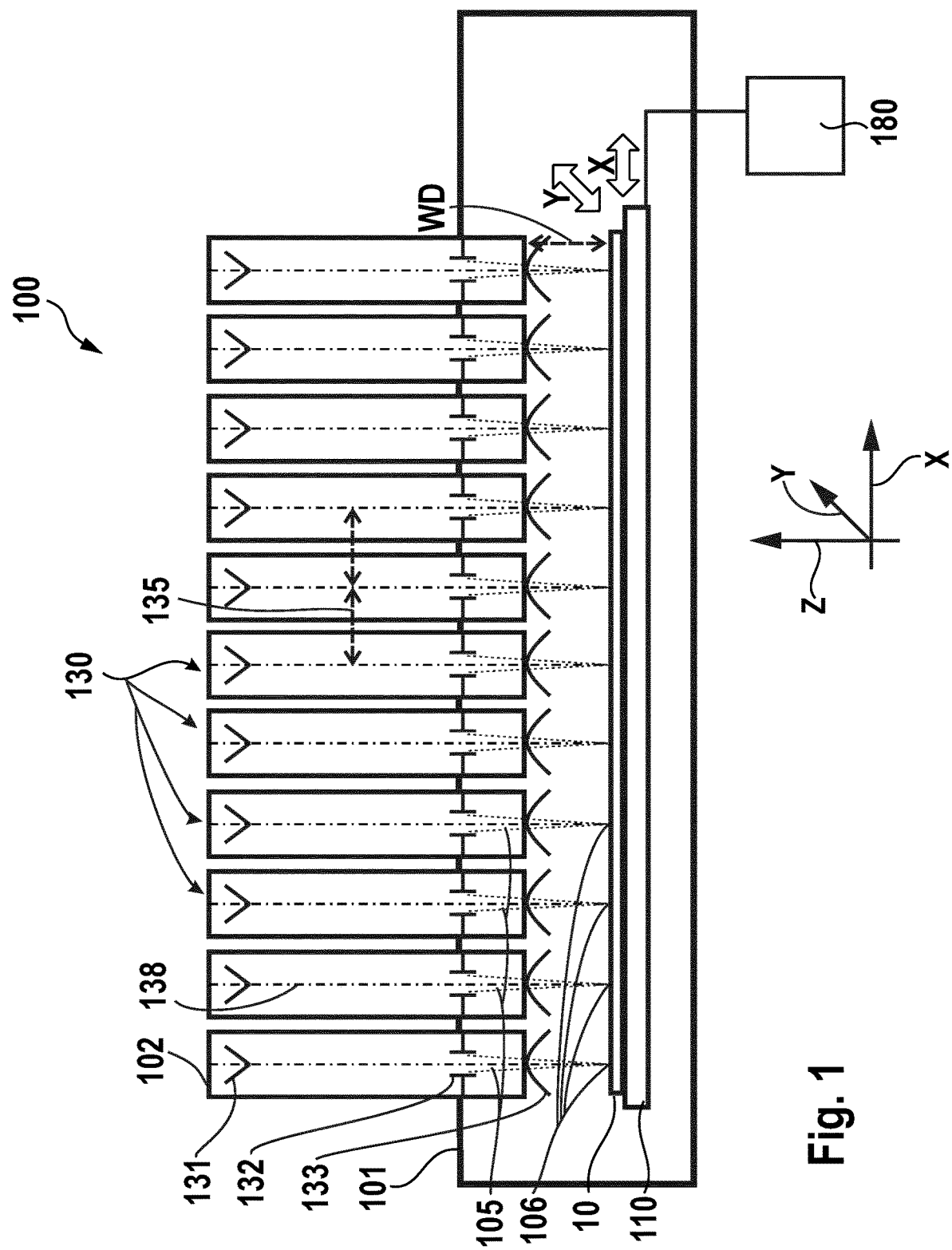
FIG. 1 is a schematic sectional view of a multi-electron beam inspection system according to embodiments described herein.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. The intention is that the present disclosure includes such modifications and variations.

Within the following description of the drawings, the same reference numbers refer to the same components. Only the differences with respect to the individual embodiments are described. The structures shown in the drawings are not necessarily depicted true to scale but rather serve the better understanding of the embodiments.

Embodiments described herein relate to multi-electron beam inspection systems for inspecting a sample with a plurality of electron beams in parallel. In multi-electron beam inspection systems, a plurality of primary electron beams or beamlets is generated and focused on the sample that is to be inspected. Signal electrons are emitted from the sample when the primary electron beams hit the sample surface. The signal electrons are detected with one or more detectors for obtaining spatial information about the sample. The sample can be imaged or otherwise inspected.

Signal electron detection may encompass the detection of secondary electrons (SE), i.e. signal electrons generated at the sample when being hit by the primary electrons (PE), and/or the detection of backscattered electrons (BSE), i.e. primary electrons backscattered from the sample at various scattering angles. Whereas secondary electrons may typically be low-energy electrons in an energy range of several eV up to a few tens of eV, backscattered electrons may have particle energies of several keV, e.g. between 1 keV and 30 keV or more.

In typical multi-electron beam inspection systems, the primary electron beams are scanned over the sample surface with scan deflectors arranged in respective inspection columns. However, a multi-electron beam inspection system with a plurality of scanning electron microscopes is typically complex and expensive, and the individual scanning electron microscopes are space-consuming. For this reason, such systems typically include only a limited number of inspection columns, which in turn limits the increase of inspection speed.

In modern electron beam inspection systems, it is becoming increasingly important to inspect samples, e.g. semiconductor wafers, very fast, accurately and with a high resolution. These objectives can be achieved with a multi-electron beam inspection system according to embodiments described herein.

FIG. 1 shows a schematic sectional view of a multi-electron beam inspection system 100 for inspecting a sample 10 (hereinafter referred to as "system 100") according to embodiments described herein. The system 100 includes a movable stage 110 for placing the sample 10 thereon and a plurality of inspection columns 130. A sample support surface of the movable stage 110 extends in an X-Y-plane. Accordingly, if a flat sample, e.g., a wafer or a glass substrate, is placed on the movable stage 110, a main surface of the sample 10 extends in the X-Y-plane, and the plurality of inspection columns 130 face toward the sample. The movable stage 110 is movable in the X-Y-plane in two transverse directions, e.g. in an X-direction (exemplarily illustrated as a horizontal direction in FIG. 1) and in a Y-direction (exemplarily illustrated as a direction perpendicular to the paper plane of FIG. 1) perpendicular to the X-direction. Alternatively or additionally, the movable stage 110 may be rotatable, such that the sample can be rotated around an axis (θ-movement).

The movable stage 110 may additionally also be movable in a Z-direction, i.e. toward and away from the plurality of inspection columns 130, e.g. in order to place the sample surface in a focal plane of the plurality of inspection columns 130 or in order to adapt the working distance of the system.

The plurality of inspection columns 130 are configured to generate a plurality of electron beams 105. As is schematically depicted in FIG. 1, the plurality of electron beams 105 propagate essentially parallel to each other toward the sample 10 that is placed on the movable stage 110. Each of the plurality of inspection columns 130 defines an optical axis 138 along which a respective one of the plurality of electron beams propagates toward the sample 10. The system 100 is configured for focusing the plurality of electron beams on the sample at a plurality of probe positions 106, the probe position 106 being arranged in a two-dimensional array.

In the sectional view of FIG. 1, only probe positions arranged next to each other in the X-direction are shown. However, it is to be understood that the two-dimensional array that is formed by the plurality of probe positions 106 on the sample extends in two transverse directions in the X-Y-plane, as is schematically depicted in FIG. 2A.

Figure 2A:
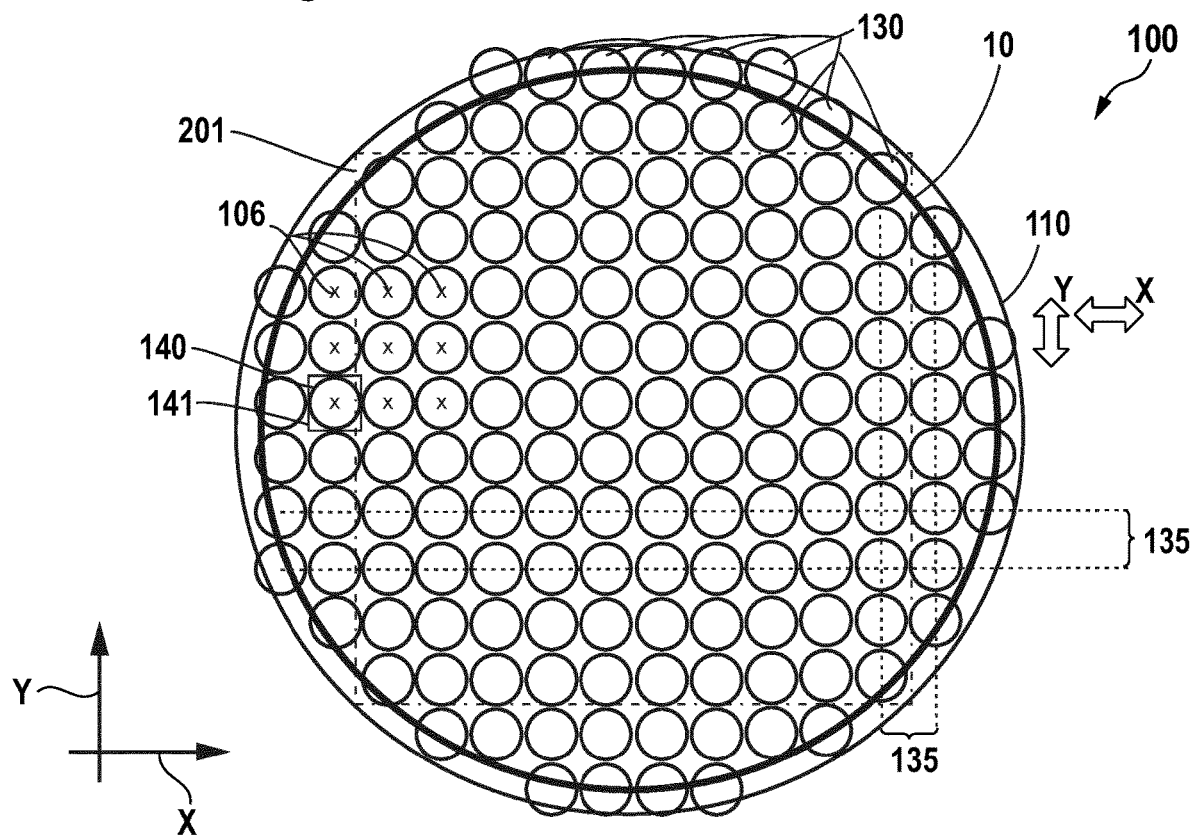
FIG. 2A is a schematic top view of a multi-electron beam inspection system according to embodiments described herein.

In particular, the plurality of inspection columns 130 may be arranged in a two-dimensional array extending in two transverse directions, as is schematically shown in FIG. 2A showing the system in a top view. A "two-dimensional array" as used herein may be understood as an array of inspection columns in which the inspection columns, in sectional planes perpendicular to the optical axis 138, are not only arranged next to each other along one single line ("one-dimension array"), but along two or more adjacent lines or in another two-dimensional pattern of inspection columns. Accordingly, the plurality of probe positions 106 where the electron beams generated in the plurality of inspection columns 130 impinge on the sample form a two-dimensional pattern of beam spots on the sample surface in the X-Y-plane (see FIG. 2A).

Returning back to FIG. 1, each inspection column of the plurality of inspection columns 130 may include a beam emitter 131 for providing an electron beam, a focusing lens 132 for focusing the electron beam on the sample at a probe position, and a detector 133 for detecting signal electrons emitted by the sample when the electron beam impinges on the sample.

In typical embodiments, the plurality of inspection columns 130 do not include any scan deflectors for scanning the electron beams over the sample surface during the sample inspection. Inspection columns 130 described herein can therefore also be referred to as "static electron beam microcolumns", which is different from conventionally used scanning electron beam columns. A static electron beam microcolumn can be understood as an electron beam inspection column configured for a sample inspection with a stationary electron beam, i.e. without a beam scanning with a scan deflector, namely by moving the sample in a scanning pattern relative to the static electron beam.

The system 100 further includes a stage controller 180 configured to move the movable stage 110 in a predetermined scanning pattern during the inspection of the sample while maintaining the plurality of electron beams stationary. Accordingly, the sample 10 is inspected by exclusively moving the movable stage 110 relative to static electron beams in the predetermined scanning pattern. The stage movement causes a scanning of the stationary electron beams over the sample surface in the predetermined scanning pattern. The electron beams may remain static during the entire inspection of the sample.

As a result, the plurality of inspection columns 130 can be built very small and comparatively inexpensively. A large number of inspection columns 130 can be provided in an array, e.g. ten or more inspection columns, particularly 50 or more inspection columns, more particularly 100 or more inspection columns, or even 150 or more inspection columns. The number of inspection columns may depend on the size of the sample that is to be inspected. For example, a system configured to inspect wafers with a diameter of 300 mm may include 100 or more and 200 or less inspection columns. A system configured to inspect wafers with a diameter of 450 mm may include even more inspection columns.

In some embodiments, each inspection column includes the beam emitter 131, the focusing lens 132, and optionally a beam corrector (shown in FIG. 3), e.g. a stigmator. In some implementations, no further beam influencing elements for influencing the primary electron beams are provided in the inspection columns. In other embodiments, a beam deflector unit (not shown) may optionally be provided in the inspection columns for tuning and/or alignment purposes of the electron beam. However, the inspection columns do typically not include a scan deflector for scanning the electron beam over the sample for inspecting the sample.

In some embodiments, the focusing lens may be an electrostatic lens, e.g. an electrostatic multipole lens, such as an octupole lens. Electrostatic lenses are small and easy to implement, such that many inspection columns can be provided next to each other at close distances.

The beam emitter may include an electron source, e.g. a cold field emitter, a thermionic emitter, a Schottky-type emitter, or another emitter configured to provide an electron beam. For example, the beam emitter may include a tip for emitting electrons and an extraction electrode.

The plurality of inspection columns include detectors for detecting signal electrons released from the sample. The detector 133 may be configured to detect any of secondary electrons (SE) and backscattered electrons (BSEs), and/or may include any one or more of a scintillator, a PIN diode, a multichannel plate, and an Everhard-Thornley detector. In some implementations, each inspection column may be provided with a respective detector for detecting secondary electrons and/or backscattered electrons generated by the respective electron beam. In some embodiments, the detector has a detector surface that surrounds the optical axis 138 of the inspection columns and has an opening for the primary electron beam to propagate therethrough. A distance between the movable stage 110 and the detector 133 may be 1 mm or more and 1 cm or less in some embodiments.

Each inspection column of the plurality of inspection columns 130 may include a respective vacuum chamber (also referred to herein as a "microscope chamber 102"), such that an interior space of each of the inspection columns can be evacuated. The microscope chamber 102 may house the beam-optical elements of the respective inspection column, particularly the beam emitter 131 and the focusing lens 132. The interior of the microscope chamber 102 can be pumped down to an ultra-high vacuum during the operation of the inspection column, e.g. to a pressure of $1 \times 10^{-8}$ mbar or less. Alternatively, two or more inspection columns of the plurality of inspection columns 130, particularly all the inspection columns, may include a single microscope chamber (not shown) that houses several beam emitters and focusing lenses. By evacuating the single microscope chamber, an interior of several inspection columns can be evacuated and be provided at an ultra-high vacuum during the inspection.

In some embodiments, the movable stage 110 for positioning the sample thereon may be provided in a sample chamber 101. The sample chamber 101 can be pumped down to a high vacuum during the operation of the system, e.g. to a pressure of $1 \times 10^{-2}$ mbar or less. The one or more microscope chambers 102 may protrude into the sample chamber 101, such that respective front ends of the plurality of inspection columns 130 are directed toward the movable stage 110. A "working distance WD" of the system as used herein may be understood as a distance between the front ends of the microscope chambers 102 (or the lowest mechanical column surface) and the sample 10 during the inspection. The sample inspection according to embodiments described herein may be carried out at a working distance of 1 mm or more and 5 mm or less.

The plurality of inspection columns 130 may be configured to inspect the sample with a resolution of 20 nm or less, particularly 10 nm or less, or even 5 nm or less. In particular, the plurality of inspection columns 130 may be configured to focus the plurality of electron beams such that electron beam probes with diameters of 20 nm or less, particularly 10 nm or less, are provided on the sample surface at the plurality of probe positions 106.

In some implementations, the plurality of inspection columns 130 are arranged in a two-dimensional array of inspection columns, the two-dimensional array including an array of A×B inspection columns extending in two transverse directions, wherein A and B are integers of 5 or more, particularly 10 or more. For example, 10×10 inspection columns may be provided in a closely packed array next to each other. In particular, essentially the whole surface of the movable stage may be "covered" with inspection columns in a top view, as is schematically depicted in FIG. 2A. The optical axes of adjacent inspection columns of the array may be arranged close to each other, e.g. at distances 135 of 5 cm or less.

The sample 10 may be inspected with the multi-electron beam inspection system 100 of FIG. 1 in the following way:

First, the sample 10 may be placed on the movable stage 110. For example, the sample 10 may be a wafer, such as a semiconductor wafer that is to be inspected. In other embodiments, the sample 10 may include a die package including two or more interconnected dies. Specifically, the sample may include an interconnection between two or more packaged dies that may be connected by advanced packaging. In yet further embodiments, the sample 10 may be a substrate, e.g. a large-area glass substrate including one or more layers deposited thereon that are to be inspected, e.g. a substrate for display manufacturing. The large-area substrate may have a surface area of 1 m$^2$ or more. A sample surface may extend in the X-Y-plane that is defined by the movable stage 110.

A plurality of electron beams 105 are generated that propagate essentially parallel to each other toward the sample 10. The plurality of electron beams 105 are focused on the sample at the plurality of probe positions 106, the plurality of probe positions 106 being arranged in a two-dimensional array in the X-Y-plane.

The movable stage 110 is moved in a predetermined scanning pattern for scanning the sample, while the plurality of electron beams are maintained static. Signal electrons emitted from the sample are detected during the stage scanning for inspecting the sample.

The movable stage 110 may be controlled by a stage controller 180, wherein the stage controller may be configured to determine a stage position with an accuracy of 20 nm or less, particularly 10 nm or less, or even 5 nm or less, and to position the stage accordingly, particularly with the assistance of an interferometer that is configured to determine a stage position in an X-direction and/or in a Y-direction (i.e., and X/Y-interferometer). Hence, the movable stage can be moved in the predetermined scanning pattern with a high accuracy. In some implementations, the stage may be interferometer-controlled. In particular, a laser interferometer may be provided for monitoring the stage position with an accuracy of 10 nm or less, particularly 5 nm or less, particularly in X- and Y-directions. The current stage position may be forwarded to an inspection controller that receives and evaluates the signals of one detector 133 or of all the detectors of the plurality of inspection columns. The secondary electron signal vs the current coordinates of the movable stage as determined by the stage controller 180 may be recorded to generate an image of the sample and/or to detect sample defects with a high resolution. By transmitting the signals of all the detectors to one inspection controller, an image of the whole sample can be composed of the individual detector signals, if desired.

Accordingly, the resulting image resolution provided by the inspection system is based on both the primary beam resolution (spot size, Upe), here typically a spot size of 20 nm or less, and the stage position accuracy reading by the interferometer, here typically 10 nm or less, resulting in an image resolution of 10 nm or less.

If the plurality of electron beams 105 provide beam probes having probe diameters of 20 nm or less (or 10 nm or less) on the sample, and the stage position is monitored and transmitted to the inspection controller with an accuracy of 10 nm or less (or 5 nm or less), it is possible to inspect the sample with a resolution of 10 nm or less (or 5 nm or less). Even better resolutions are possible.

In some embodiments, a plurality of ten or more electron beams are generated and focused on the sample, particularly 50 or more electron beams, or even 100 or more electron beams. Accordingly, the inspection speed can be increased by a factor of 50 or 100 as compared to a one-beam inspection system, and at the same time a high-resolution inspection of the sample surface within a nm-scale is possible. To give an example: In a one-beam inspection system, the inspection of a surface area of 1 cm$^2$ with a resolution of 10 nm may typically take several hours, such that the inspection of a surface area of several hundred cm$^2$ (e.g., the inspection of a typical wafer) is impossible in practice. Using the system described herein that uses 100 or more electron beams in parallel, it becomes possible to inspect entire wafer surfaces (e.g., hundreds of cm$^2$) on a reasonable timescale, e.g. in several hours of scanning.

FIG. 2A is a schematic top view of a multi-electron beam inspection system 100 according to embodiments described herein. The system 100 includes a plurality of inspection columns 130 arranged in a two-dimensional array, the array extending in X- and Y-directions above the movable stage 110 on which a sample 10 is placed in the X-Y-plane. The sample is exemplarily illustrated as a round wafer.

Figure 2B:
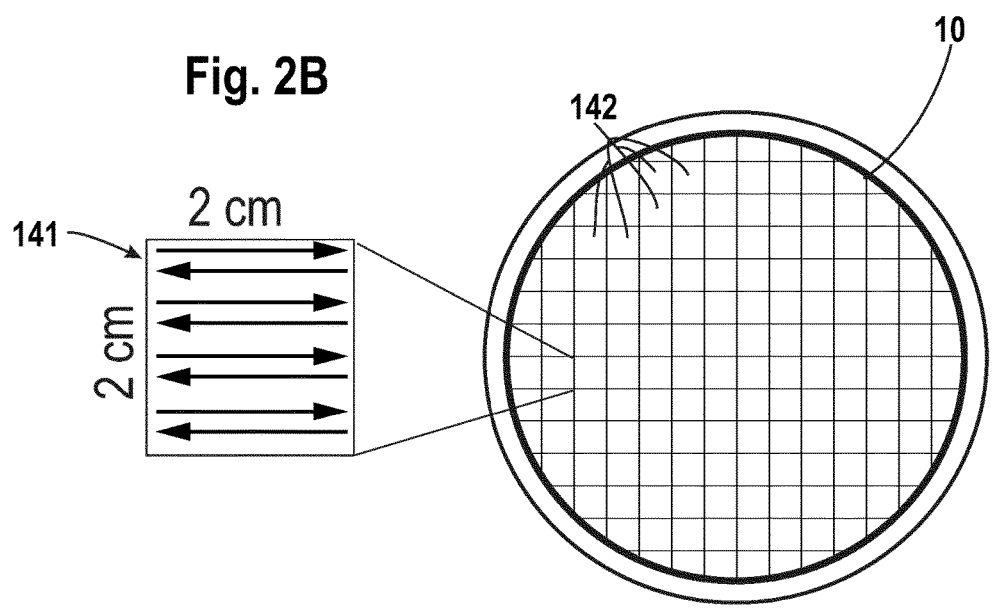
FIG. 2B shows a sample to be inspected for illustrating an inspection method described herein.

FIG. 2B shows a top view of the sample 10 of FIG. 2A without the plurality of columns 130, for explaining a scanning pattern used according to method described herein.

The plurality of inspection columns 130, e.g. inspection column 140, are schematically illustrated as circles in the top view of FIG. 2A. The inspection columns may be configured in accordance with the plurality of inspection columns 130 of the system 100 of FIG. 1, such that reference can be made to the above explanations, which are not repeated here.

The two-dimensional array that is defined by the plurality of inspection columns 130 may be arranged in "lines" and "columns". At least some of the lines of the array may include five, ten or more inspection columns, and at least some of the columns of the array may include five, ten or more inspection columns. Specifically, the two-dimensional array may include a (sub-)array of A×B inspection columns arranged in lines and columns, A and B being integers of five, ten, or more. A 10×10 (sub-)array of the two-dimensional array is illustrated in FIG. 2A by dashed line 201.

In some embodiments, adjacent inspection columns of the plurality of inspection columns 130 are arranged at close distances next to each other. In particular, optical axes of two adjacent columns of the plurality of inspection columns 130 may be spaced from each other at distances of 5 cm or less, particularly 3 cm or less, more particularly about 2 cm, respectively. As is schematically depicted in FIG. 2A, distances 135 between two adjacent inspection columns in the rows of the array may be 5 cm or less, respectively, and/or distances 135 between two adjacent inspection columns in the columns of the array may be 5 cm or less, respectively (the distances 135 are measured between the optical axes of the inspection columns). Accordingly, an array of closely packed inspection columns is provided. In some implementations, essentially the entire sample support surface of the movable stage 110 may be covered with inspection columns, each inspection column having a maximum dimension of 5 cm in a sectional plane extending in X-Y-directions.

In some embodiments, which can be combined with other embodiments described herein, the plurality of inspection columns 130 are small static electron beam microcolumns. A microcolumn may have a maximum dimension in a plane perpendicular to the optical axis of 5 cm or less, particularly 3 cm or less. Providing very many small microcolumns in a closely packed array allows for a considerable increase of the inspection speed of a sample.

During the inspection, the plurality of static electron beams form, in sectional planes parallel to the X-Y-plane, a two-dimensional beam array. Likewise, the plurality of probe positions 106 are arranged in a two-dimensional array on the sample. Electron beams arranged adjacent to each other in a first direction (e.g., in the X-direction) and/or electron beams arranged adjacent to each other in a second direction (e.g., in the Y-direction) transverse to the first direction may be spaced from each other at the distances 135 of 5 cm or less, particularly 3 cm or less, more particularly about 2 cm, respectively.

Referring now to FIG. 2B, each inspection column may be arranged above a respective sub-area of the sample 10 for inspecting the respective sub-area with a high resolution. The sample 10 may include a plurality of sub-areas 142 of essentially corresponding shape (e.g. rectangular or quadratic sub-areas), and in each of the plurality of sub-areas 142 an associated one of the plurality of electron beams may be focused at a respective probe position. The scanning may include moving the movable stage 110 in the predetermined scanning pattern, such that the plurality of sub-areas 142 are simultaneously inspected by the plurality of electron beams, until 90% or more of the surface area of the plurality of sub-areas 142 is inspected, particularly with a resolution of 20 nm or less. In particular, essentially the whole surface area of the plurality of sub-areas may be inspected with a high resolution (e.g., 20 nm or 10 nm or less) with static electron beams by moving the movable stage in the predetermined scanning pattern.

In some implementations, 10, 50, 100 or more sub-areas of the sample are inspected in parallel with a plurality of static electron beams at a high resolution.

The plurality of sub-areas 141 may be essentially rectangularly shaped and/or may have a respective surface area of 3 $cm^2$ or more and 10 $cm^2$ or less, particularly about 4 $cm^2$. Specifically, the sub-areas may be rectangles having a width between 1.5 cm and 3 cm and a length between 1.5 cm and 3 cm, e.g. rectangles having a width of about 2 cm and a length of about 2 cm, i.e. a surface area of about 4 $cm^2$. Optionally, further sub-areas that include an edge region of the sample may have the shape of cut rectangles. The rectangles may be synchronously inspected with the static electron beams via the stage movement.

The plurality of sub-areas may be raster-scanned by moving the movable stage in a raster-scanning pattern. The line length of the raster-scanning pattern may essentially correspond to a width of the plurality of sub-areas 141. Moving the movable stage in a raster-scanning pattern may cause the static electron beams to move over the sub-areas until essentially the entire sub-area surface is inspected with a high resolution. In some embodiments, the scanning pattern may include stage movements in scan lines in an X-direction and Y-shifts to the respective next line in a Y-direction in an alternating manner. In order to save time, the inspection may take place both during a forward and a back movement in the X-direction, i.e. lines may alternatively be scanned during back- and forward movements of the movable stage in the X-direction, as is schematically depicted for the enlarged sub-area 141 in FIG. 2B.

In some implementations, 90% or more of the surface area of the sample, particularly essentially the entire surface of the sample is inspected with the plurality of electron beams with a high resolution, particularly with a resolution of 10 nm or less. For example, the sample may be a wafer with a surface area of 400 $cm^2$ or more, and 360 $cm^2$ or more of said surface area, or the whole surface area, may be inspected with said high resolution with static electron beams. Specifically, each electron beam of 100 or more electron beams may inspect a sub-area of the sample with a surface area of 3 $cm^2$ or more and 10 $cm^2$ or less.

Example: The plurality of inspection columns 130 may be configured to read secondary electron (SE) signals with a frequency of 100 MHz. The sub-area 141 of the sample that is to be inspected with one inspection column 140 may be a 2 cm×2 cm rectangle. In order to obtain a resolution of 10 nm, 2e-6 secondary electron signals need to be read out during the stage movement along a 2 cm scan line, and a total of 2e-6 lines are to be scanned. Considering the inspection frequency of 100 MHz, the inspection of one scan line with a resolution of 10 nm takes 20 msec, and the inspection of the total of 2e-6 lines takes about 11 hours.

Accordingly, a sample with a surface area of 400 $cm^2$ can be inspected with a system as described herein, including 100 or more inspection columns, with a 10-nm resolution in 11 hours or less, as compared to 11×100 hours (1.5 months) in a one-beam system.

Figure 3:
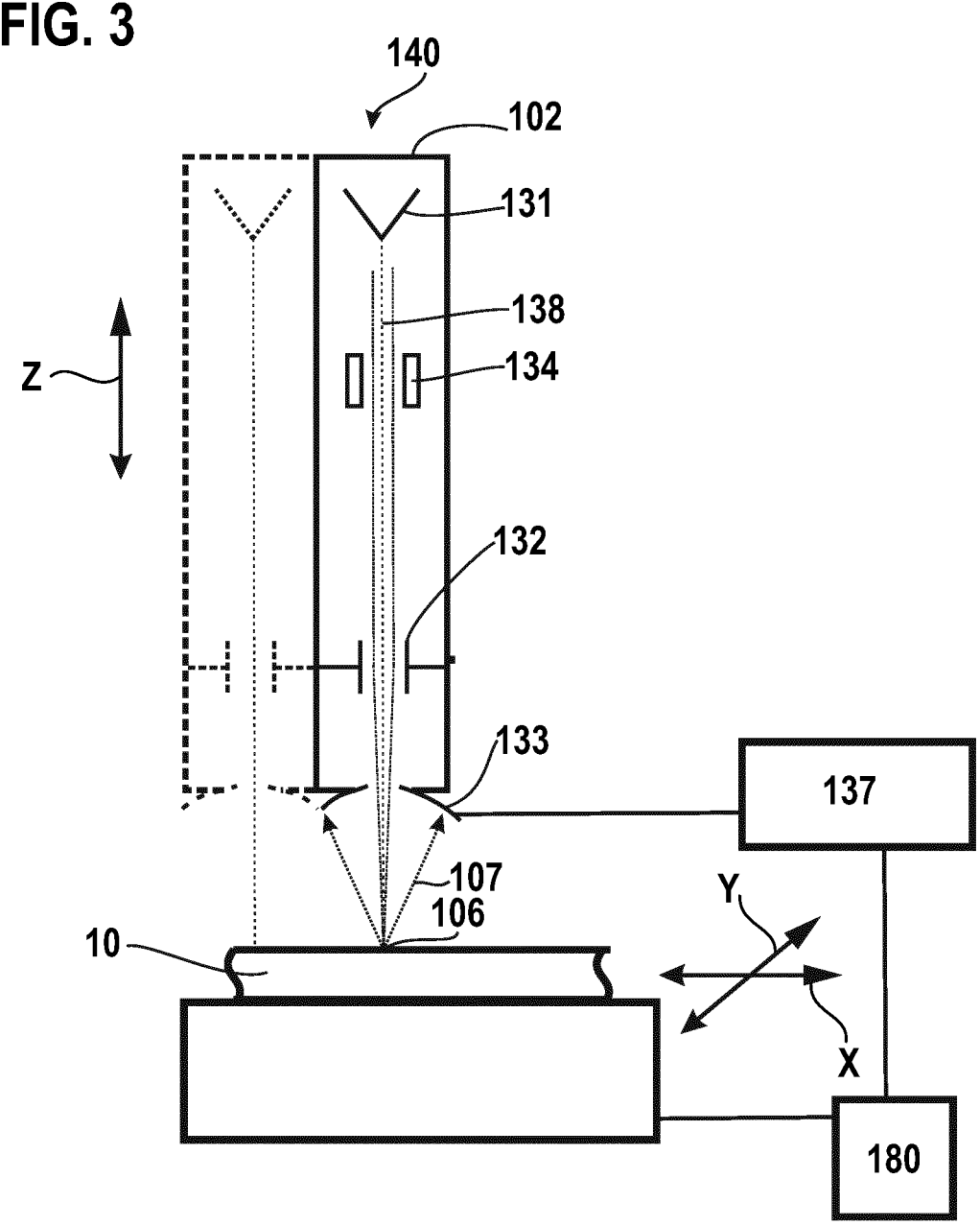
FIG. 3 shows a schematic sectional view of an inspection column of a multi-electron beam inspection system according to embodiments described herein.

FIG. 3 shows a schematic sectional view of an inspection column 140 of a multi-electron beam inspection system 100 according to embodiments described herein. A plurality of such inspection columns may be arranged adjacent to each other at close distances, as is depicted in FIG. 1.

The inspection column 140 may be a static electron beam microcolumn as previously described. The inspection column 140 may be configured to direct a static electron beam on a sample 10. The inspection column 140 includes a beam emitter 131 for generating an electron beam that propagates along an optical axis 138 of the inspection column toward a sample 10. The inspection column 140 further includes a focusing lens 132, and optionally a beam corrector 134, e.g. a stigmator, arranged in a microscope chamber 102 that can be evacuated. The focusing lens 132 is configured to focus the electron beam on the sample 10 at a probe position 106.

Further, the inspection column 140 includes a detector 133 for detecting signal electrons 107. The signal of the detector 133 may be forwarded to an inspection controller 137 that receives the current stage position of the movable stage from the stage controller 180 with a high accuracy, e.g. in the range of 10 nm or less. By recording the electron signal vs stage position during the movement of the movable stage in the predetermined scanning pattern, a high-resolution image of the sample can be generated, and/or the sample can be inspected with a high accuracy. Sample defects can be reliably detected.

The inspection column 140 may not include any scan deflector for scanning the electron beam over the sample for inspection purposes. Optionally, a beam deflector (not shown) for alignment or tuning purposes may be provided.

The electron beam may have a probe diameter of 20 nm or less at the probe position 106, such that an inspection with a sub-10-nm resolution is possible.

Accordingly, a comparatively simple and small inspection column 140 is provided that is nevertheless suitable for a high-resolution inspection of sample surfaces. Accordingly, very many inspection columns can be arranged close to each other in a two-dimensional array of inspection columns, allowing an increased inspection speed due to the parallel inspection with many electron beams.

Figure 4:
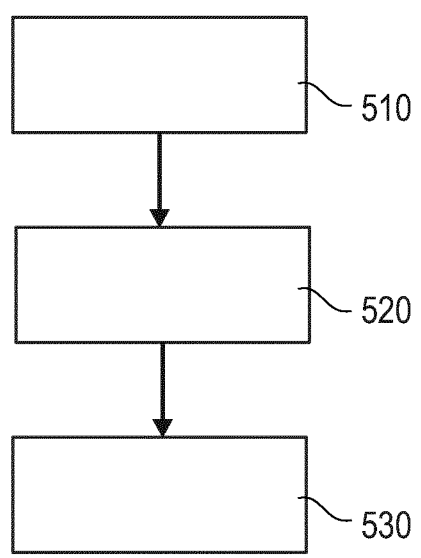
FIG. 4 shows a flow chart illustrating a method of inspecting a sample with a multi-electron beam inspection system according to embodiments described herein.

FIG. 4 shows a flow chart illustrating a method of inspecting a sample with a multi-electron beam inspection system according to embodiments described herein.

In box 510, a sample is placed on the movable stage, such that a main surface of the sample extends essentially in the X-Y-plane. The sample may be any of a semiconductor wafer, a die package, or a coated substrate.

In box 520, a plurality of electron beams is generated that propagate essentially parallel to each other toward the sample. The plurality of electron beams are focused on the sample at a plurality of probe positions.

In box 530, the sample is scanned by moving the movable stage in a predetermined scanning pattern while maintaining the plurality of electron beams stationary. The movable stage may be moved such that each of the plurality of electron beams inspects a predetermined sub-area of the sample with a high resolution, e.g. by moving the movable stage in a raster-scanning pattern. The scanning pattern of the movable stage causes a synchronous movement of the plurality of electron beams relative to the respective sub-area exactly in the same manner. No synchronous control of a plurality of scan deflectors is required. This is because all the electron beams remain immovable, and the relative movement is exclusively due to the stage movement. Signal acquisition accuracy can be improved and the complexity of the signal evaluation can be decreased. This allows the inspection speed to be increased further.

In box 530, signal electrons emitted from the sample are detected by respective detectors of the plurality of inspection columns during the scanning movement of the movable stage. The detector signals may be transmitted to an inspection controller that records and/or evaluates the signal in dependence of the current stage position. A high-resolution image of the sample can be generated and/or the sample can be inspected with a high accuracy.

The scanning and detecting in box 530 may continue until a large portion of the sample is inspected with a high resolution, e.g. 50% or more of the sample surface, particularly 90% or more of the sample surface, or even essentially the whole sample surface. Optionally, an image of the whole sample can be generated by combining the measurements of the plurality of inspection columns.

Methods and systems described herein are beneficial and provide the following advantages: The inspection speed is increased due to the parallel signal acquisition from very many inspection columns. The sample can be inspected with a high resolution that is determined by the accuracy of the stage coordinates, i.e. is limited by the interferometer resolution of the stage controller. A better and stronger signal is obtained, as the detector and the inspection column design is simpler and more efficient than for scanning electron beam columns.

Summarizing the above, the present disclosure specifically provides the following embodiments:

Embodiment 1: A method of inspecting a sample with a multi-electron beam inspection system, including: placing the sample on a movable stage extending in an X-Y-plane; generating a plurality of electron beams propagating essentially parallel to each other toward the sample; focusing the plurality of electron beams on the sample at a plurality of probe positions 106 arranged in a two-dimensional array; scanning the sample by moving the movable stage in a predetermined scanning pattern while maintaining the plurality of electron beams stationary; and detecting signal electrons emitted from the sample during the moving of the movable stage for inspecting the sample.

Embodiment 2: The method of embodiment 1, wherein the plurality of electron beams includes ten or more electron beams, particularly 50 or more electron beams, more particularly 100 or more electron beams.

Embodiment 3: The method of embodiment 1 or 2, wherein the plurality of electron beams form, in sectional planes parallel to the X-Y-plane, a two-dimensional beam array, wherein electron beams arranged adjacent to each other in a first direction (X) and/or electron beams arranged adjacent to each other in a second direction (Y) transverse to the first direction are spaced from each other at distances of 5 cm or less, particularly of 3 cm or less, respectively. In particular, the distances between adjacent electron beams are from 1 cm to 3 cm, e.g. about 2 cm.

Embodiment 4: The method of any one of embodiments 1 to 3, wherein the sample is inspected with a resolution of 20 nm or less, particularly 10 nm or less, and/or wherein the plurality of electron beams have probe diameters at the plurality of probe positions of 40 nm or less, particularly of 20 nm or less, more particularly of 10 nm or less, or even 5 nm or less.

Embodiment 5: the method of any one of embodiments 1 to 4, wherein 90% or more of a surface area of the sample is inspected with the plurality of electron beams, in particular wherein the entire sample surface is inspected with the plurality of electron beams. The plurality of electron beams may be maintained stationary during the entire inspection, while the stage is moved relative to the plurality of electron beams in a predetermined scanning pattern. Specifically, the electron beams are not scanned with a scan deflector. The inspection resolution may be 20 nm or less, particularly 10 nm or less.

Embodiment 6: The method of any one of embodiments 1 to 5, wherein the sample includes a plurality of sub-areas of essentially the same shape, and in each of the plurality of sub-areas an associated one of the plurality of electron beams is focused at a probe position. The scanning includes moving the movable stage in the predetermined scanning pattern such that the plurality of sub-areas are simultaneously inspected with the plurality of electron beams, until 90% or more of the surface area of the plurality of sub-areas is inspected, specifically until essentially the entire surface area of the plurality of sub-areas is inspected.

Embodiment 7: The method of embodiment 6, wherein the plurality of sub-areas are essentially rectangularly shaped, and the movable stage is moved in the predetermined scanning pattern, e.g. in a raster-scan pattern, until essentially the entire surface area of the plurality of sub-areas is inspected, particularly at a resolution of 20 nm or less. For example, the scanning pattern may include stage movements in scan lines in an X-direction and Y-shifts in a Y-direction in an alternating manner.

Embodiment 8: The method of embodiment 6 or 7, wherein the sub-areas of the plurality of sub-areas have a respective surface area of 3 $cm^2$ or more and 10 $cm^2$ or less, particularly 4 $cm^2$ or more and 6 $cm^2$ or less. In particular the sub-areas may be rectangles of about 2 cm×2 cm.

Embodiment 9: The method of any one of embodiments 1 to 8, wherein the plurality of electron beams includes 100 or more electron beams, the sample has a surface area of 400 $cm^2$ or more, and the movement of the movable stage in the predetermined scan pattern causes each of the plurality of electron beams to move over a surface area of 3 $cm^2$ or more and 10 $cm^2$ or less of a sub-area of the sample while providing an inspection resolution of 20 nm or less.

Embodiment 10: The method of any one of embodiments 1 to 9, wherein the movable stage is interferometer-controlled, and a stage controller is configured to determine a stage position with a resolution of 20 nm or less, particularly 10 nm or less, or even 5 nm or less.

Embodiment 11: The method of any one of claims 1 to 10, wherein the sample is at least one of a wafer and a die package including two or more connected dies.

Embodiment 12: The method of any one of claims 1 to 11, wherein the sample is inspected with a working distance WD of 2 mm or more and 5 mm or less.

Embodiment 13: A multi-electron beam inspection system, particularly for inspecting a sample in accordance with any of the above methods, including: a movable stage extending in an X-Y-plane for placing the sample thereon, and a plurality of inspection columns for generating a plurality of electron beams propagating essentially parallel to each other and configured to focus the plurality of electron beams on the sample at a plurality of probe positions arranged in a two-dimensional array. The plurality of inspection columns respectively include a beam emitter, a focusing lens, and a detector for detecting signal electrons. The multi-electron beam inspection system further includes a stage controller configured to move the movable stage in a predetermined scanning pattern during a sample inspection while maintaining the plurality of electron beams stationary.

Embodiment 14: The system of embodiment 13, wherein the plurality of inspection columns do not include any scan deflectors. The focusing lens may be an electrostatic lens, e.g. including an electrostatic octupole.

Embodiment 15: The system of embodiment 13 or 14, wherein the plurality of inspection columns further include a beam corrector, particularly a stigmator, respectively.

Embodiment 16: The system of any of embodiments 13 to 15, wherein the plurality of inspection columns are configured to provide beam probes having probe diameters of 20 nm or less on the sample, particularly 10 nm or less, for obtaining an inspection resolution of 10 nm or less.

Embodiment 17: The system of any of embodiments 13 to 16, wherein the plurality of inspection columns are arranged in a closely packed array of A×B columns in X- and Y-directions, A and B being respective integers of 5 or more, particularly of 10 or more.

Embodiment 18: A multi-electron beam inspection system, including a plurality of inspection columns arranged in a two-dimensional array in X- and Y-directions and facing toward a movable stage for placing the sample thereon, and a stage controller configured to move the movable stage in a predetermined scanning pattern in an X-Y-plane. The plurality of inspection columns are static electron beam microcolumns without scan deflectors.

Embodiment 19: The system of embodiment 18, wherein the plurality of inspection columns are configured for a parallel sample inspection with a resolution of 20 nm or less, particularly 10 nm or less.

Embodiment 20: The system of embodiment 18 or 19, wherein the two-dimensional array comprises an array of A×B columns in X- and Y-directions, A and B being respective integers of 5 or more, particularly 10 or more. Optical axes of two adjacent columns of the array may be spaced from each other at distances of 5 cm or less, particularly 3 cm or less, respectively.

While the foregoing is directed to some embodiments, other and further embodiments may be devised without departing from the basic scope thereof, and the scope thereof is determined by the claims that follow.

The invention claimed is:

1. A method of inspecting a sample comprising:
    placing the sample on a movable stage extending in an X-Y-plane;
    generating a plurality of electron beams propagating toward the sample;
    focusing the plurality of electron beams on the sample at a plurality of probe positions arranged in a two-dimensional array;
    scanning the sample by moving the movable stage in a predetermined raster-scanning pattern while maintaining the plurality of electron beams stationary; and
    detecting signal electrons emitted from the sample during the scanning for inspecting the sample, the sample being inspected, by moving the sample stage in the predetermined raster-scanning pattern relative to the plurality of electron beams held static.

2. The method of claim 1, wherein the plurality of electron beams comprises ten or more electron beams.

3. The method of claim 1, wherein the plurality of electron beams form, in sectional planes parallel to the X-Y-plane, a two-dimensional beam array, with electron beams arranged adjacent to each other in a first direction being spaced from each other at distances of 5 cm or less, respectively.

4. The method of claim 1, wherein the sample is inspected with a resolution of 20 nm or less.

5. The method of claim 1, wherein 90% or more of a surface area of the sample is inspected with the plurality of electron beams.

6. The method of claim 5, wherein the sample is inspected with a resolution of 10 nm or less.

7. The method of claim 1, wherein the sample comprises a plurality of sub-areas of essentially corresponding shape, and in each of the plurality of sub-areas an associated one of the plurality of electron beams is focused at a probe position, the scanning comprising:
    moving the movable stage in the predetermined scanning pattern such that the plurality of sub-areas are simultaneously inspected by the plurality of electron beams, until 90% or more of the surface area of the plurality of sub-areas is inspected.

8. The method of claim 7, wherein the sub-areas are essentially rectangularly shaped.

9. The method of claim 7 wherein the sub-areas have a respective surface area of 3 $cm^2$ or more and 10 $cm^2$ or less.

10. The method of claim 1, wherein
    the plurality of electron beams comprises 100 or more electron beams,
    the sample has a surface area of 400 $cm^2$ or more, and
    the plurality of electron beams inspect a respective sub-area of the sample with a surface area of 3 $cm^2$ or more and 10 $cm^2$ or less with a resolution of 20 nm or less.

11. The method of claim 1, wherein the movable stage is interferometer-controlled, and a stage controller is configured to determine a stage position with an accuracy of 10 nm or less.

12. The method of claim 1, wherein the plurality of electron beams form, in sectional planes parallel to the X-Y-plane, a two-dimensional beam array, with electron beams arranged adjacent to each other in a first direction and electron beams arranged adjacent to each other in a second direction transverse to the first direction being spaced from each other at distances 5 cm or less, respectively.

13. A multi-electron beam inspection system for inspecting a sample, comprising:
    a movable stage extending in an X-Y-plane for placing the sample thereon;

a plurality of inspection columns for generating a plurality of electron beams and configured for focusing the plurality of electron beams on the sample at a plurality of probe positions arranged in a two-dimensional array, the plurality of inspection columns respectively comprising:
a beam emitter;
a focusing lens; and
a detector for detecting signal electrons; and
a stage controller configured to move the movable stage in a predetermined raster-scanning pattern during an inspection of the sample while maintaining the plurality of electron beams stationary, the plurality of inspection columns not comprising scan deflectors.

14. The system of claim 13, wherein the plurality of inspection columns further comprise a beam corrector.

15. The system of any of claim 13, wherein the plurality of inspection columns are configured to provide beam probes having probe diameters of 20 nm or less on the sample.

16. The system of any of claim 13, wherein the plurality of inspection columns comprise an array of A×B inspection columns extending in X- and Y-directions, A and B being integers of 5 or more.

17. A multi-electron beam inspection system for inspecting a sample, comprising:
a plurality of inspection columns, without scan deflectors, being arranged in a two-dimensional array extending in X- and Y-directions and facing toward a movable stage for placing the sample thereon; and
a stage controller configured to move the movable stage in a raster-scanning pattern in an X-Y-plane.

18. The system of claim 17, wherein the plurality of inspection columns are configured for a sample inspection with a resolution of 20 nm or less.

19. The system of claim 17, wherein the two-dimensional array comprises an array of A×B inspection columns, A and B being integers of 5 or more, and optical axes of two adjacent columns of the array being spaced from each other at distances of 3 cm or less, respectively.

* * * * *